(12) United States Patent
Mikami et al.

(10) Patent No.: US 6,519,977 B2
(45) Date of Patent: Feb. 18, 2003

(54) OPTICAL FIBER PREFORM SUSPENDING AND SUPPORTING APPARATUS AND OPTICAL FIBER PREFORM PROCESSING APPARATUS

(75) Inventors: Toshihiro Mikami, Tochigi (JP); Yukio Kohmura, Aichi (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 66 days.

(21) Appl. No.: 09/810,507

(22) Filed: Mar. 19, 2001

(65) Prior Publication Data

US 2002/0014094 A1 Feb. 7, 2002

(30) Foreign Application Priority Data

Mar. 21, 2000 (JP) ........................................ 2000-078174

(51) Int. Cl.[7] ............................................ C03B 37/029
(52) U.S. Cl. ............................. 65/507; 65/500; 65/537; 65/540; 65/427; 65/385; 248/317; 432/253; 432/258
(58) Field of Search ........................ 65/500, 385, 537, 65/540, 427, 507; 248/317; 432/253, 258

(56) References Cited

U.S. PATENT DOCUMENTS

| | | | | |
|---|---|---|---|---|
| 5,032,079 A | * | 7/1991 | Tsuchiya et al. ............ | 432/253 |
| 5,417,399 A | * | 5/1995 | Saito et al. .................. | 248/317 |
| 5,423,898 A | * | 6/1995 | Terashima et al. ............ | 65/385 |
| 5,674,306 A | * | 10/1997 | Hoshino et al. .............. | 65/385 |

FOREIGN PATENT DOCUMENTS

| | | | |
|---|---|---|---|
| EP | 0519468 | * | 12/1992 |
| JP | 2683757 | | 8/1997 |

* cited by examiner

*Primary Examiner*—James Derrington
(74) *Attorney, Agent, or Firm*—Oblon, Spivak, McClelland, Maier & Neustadt, P.C.

(57) ABSTRACT

An optical fiber preform suspending and supporting apparatus able to prevent deformation of a pin placed in a high temperature environment and able to support a porous optical fiber preform without adversely influencing supports of the pin and without causing inclination relative to the vertical line of a main shaft, wherein a movable connector is fitted into an enlarged-diameter portion of the lower end of a main shaft, this enlarged-diameter portion is connected with the movable connector by a pin so that the movable connector is able to swing around the pin, a holding portion including a supporting portion is formed integrally at the bottom of the movable connector to hold an enlarged-diameter portion of the upper end of a starting preform, and the diameter of the pin is in the range of 20% to 50% of the outside diameter of the enlarged-diameter portion of the lower end of the main shaft, and an optical fiber processing apparatus including the same.

22 Claims, 5 Drawing Sheets

OPTICAL FIBER PREFORM SUSPENDING AND SUPPORTING APPARATUS AND OPTICAL FIBER PREFORM PROCESSING APPARATUS

BACKGROUND OF THE INVENTION

1. Field of the Invention

The present invention relates to an optical fiber preform suspending and supporting apparatus for suspending and supporting a porous optical fiber preform at its upper end, and an optical fiber preform processing apparatus using the optical fiber suspending and supporting apparatus, in a process of producing a porous optical fiber preform on a starting preform by a VAD method or an OVD method or in a process after the above one for vitrifying (dehydrating and sintering) the porous optical fiber preform.

2. Description of the Related Art

An optical fiber comprised of a core and a cladding is formed by heating and drawing a vitrified optical fiber preform.

The method for producing such an optical fiber preform will be described below. First, a core portion porous optical fiber preform is deposited and formed at the lower end of a starting preform (a seed rod) by the VAD method. Then, this core portion porous optical fiber preform is heat treated in a vitrification (dehydration and sintering) step to obtain a transparent core use optical fiber preform. Next, using this transparent core use optical fiber preform as a starting preform, a cladding portion porous optical fiber preform is deposited and formed by the OVD method. Next, the cladding portion porous optical fiber preform is heated in a vitrification (dehydration and sintering) step to obtain a transparent optical fiber preform.

The resultant transparent vitrified optical fiber preform is heated and drawn to form an optical fiber comprised of for example a core of a diameter of 10 μm and a cladding of a diameter of 125 μm at the circumference of the core.

When producing such a core portion porous optical fiber preform and cladding portion porous optical fiber preform, the porous optical fiber preforms are suspended and supported at the upper end by an optical fiber preform suspending and supporting apparatus. As known optical fiber preform suspending and supporting apparatuses, there are a pin supporting type, a chuck supporting type, and a combined type of the two.

FIG. 1 is a vertical sectional view of the structure of a pin supporting type optical fiber preform suspending and supporting apparatus 5A. Specifically, the optical fiber preform suspending and supporting apparatus 5A shown in FIG. 1 is configured to be housed in a dehydration and sintering furnace, as an example of an optical fiber preform processing apparatus, used when vitrifying a porous glass layer 8 for cladding to make it transparent in a vitrification (dehydration and sintering) step of a porous optical fiber preform 6 comprising a core use optical fiber preform, that is, a starting preform 7, and a porous glass layer 8 for cladding produced on the starting preform 7 by the OVD method.

In the dehydration and sintering furnace schematically illustrated in FIG. 1, a pin supporting type optical fiber preform suspending and supporting apparatus 5A is provided so that a main shaft 4 passes through a hole 3 in the upper lid 2 of a furnace tube 1 made of silica-based glass or the like. A not illustrated rotation and support mechanism is provided at the upper portion of the main shaft 4. The rotation and support mechanism supports the main shaft 4 from which the porous optical fiber preform 6 is suspended and rotates the porous optical fiber preform 6 by rotating the main shaft 4.

In this way, the porous optical fiber preform 6 is supported and suspended by the main shaft 4 at the upper end of the starting preform 7 by the optical fiber preform suspending and supporting apparatus 5A.

In this case, the starting preform 7 is the transparent core use optical fiber preform formed on a seed rod. A porous glass layer 8 for cladding is deposited at the circumference of the starting preform 7.

The optical fiber preform suspending and supporting apparatus 5A is structured so that the upper end of the starting preform 7 is inserted inside a supporting cylinder 9 at the lower end of the main shaft 4 and a pin 12 is inserted into through holes 10 and 11 formed horizontally in the supporting cylinder 9 and starting preform 7 at the portion where they are fit together so that the starting preform 7 can swing around the pin 12.

At the circumference of the furnace tube 1, a heater 13 for heating and vitrifying the porous optical fiber preform 6 is provided.

Such an optical fiber preform suspending and supporting apparatus 5A is housed at the inside of the high temperature furnace tube 1 to vitrify the porous optical fiber preform, so it is made of heat resistant silica-based glass or the like so as to prevent the invasion of impurities into the porous optical fiber preform 6.

In the pin supporting type optical fiber preform suspending and supporting apparatus 5A shown in FIG. 1, since the through holes 10 and 11 are formed in the supporting cylinder 9 and the upper portion of the starting preform 7 and the pin 12 is passed through the through holes 10 and 11 to support the porous optical fiber preform 6 by the main shaft 5, it suffers from the disadvantage of a degraded mechanical strength of the starting preform 7 in which the through hole 11 is formed. In particular, recently large-sized porous optical fiber preforms 6 have been formed. Thus, the porous optical fiber preforms 6 have become heavier too, so the decline of the mechanical strength of the starting preform 7 becomes a problem.

Furthermore, due to the restriction of the mechanical strength of the starting preform 7, the diameter of the through hole 11 formed in the porous optical fiber preform 6 through which the pin 12 is passed cannot be made too large. Therefore it suffers from another disadvantage that since the diameter of the pin 12 is therefore also small, when placed in the high temperature furnace tube 1 for vitrification, the pin 12 is liable to deform due to the heat from the heater 13.

In order to overcome these disadvantages, for example, Japanese Patent No. 2683757 proposed to provide a gas passage along the axial line of the main shaft 4 and supply a cooling gas through the gas passage to cool the pin 12 and therefore prevent a decline of the mechanical strength of the pin supporting type optical fiber preform suspending and supporting apparatus 5A. In such a configuration, however, it is needed to provide means for controlling the flow rate of the cooling gas, preventing reverse flow by controlling the internal pressure of the reaction vessel in the furnace tube, and preventing leakage at the rotating connecting portion of a gas joint of the tube for conducting the cooling gas. Consequently, it suffers from another disadvantage that the operation and maintenance of the dehydration and sintering furnace become rather expensive.

FIG. 2 is a vertical sectional view of the structure of a chuck supporting type optical fiber preform suspending and supporting apparatus 5B. In the same way as FIG. 1, FIG. 2 shows an example of the case where an optical fiber preform suspending and supporting apparatus 5B is housed in a dehydration and sintering furnace for vitrifying a cladding portion porous optical fiber preform produced by the OVD method in a vitrification (dehydration and sintering) step.

In the chuck supporting type optical fiber preform suspending and supporting apparatus 5B, a holding portion 14 comprising a chuck is integrally provided at the lower end of the main shaft 4. The holding portion 14 is provided with an insertion space 15 open at one side and with a slit 16 for insertion of a starting preform at a supporting portion 14a at the bottom of the insertion space 15.

Such an optical fiber preform suspending and supporting apparatus 5B, as described previously with reference to FIG. 1, is also made of silica-based glass to prevent the invasion of impurities into the porous optical fiber preform 6.

When using the chuck supporting type optical fiber preform suspending and supporting apparatus 5B illustrated in FIG. 2, the porous optical fiber preform 6 comprised of the core use optical fiber preform (starting preform) 7 and the porous glass layer 8 deposited on it is formed with an enlarged-diameter portion 7a at the upper end of the starting preform 7. The enlarged-diameter portion 7a of the starting preform 7 is inserted into the starting preform insertion slit 16. By supporting the enlarged-diameter portion 7a at the upper end of the starting preform 7 by the supporting portion 14a of the chuck holding portion 14, the porous optical fiber preform 6 is supported and suspended downward.

In the chuck supporting type optical fiber preform suspending and supporting apparatus 5B illustrated in FIG. 2, however, it is difficult to precisely machine a shape like the enlarged-diameter portion 7a at the upper end of the starting preform 7. Generally the machining accuracy of the enlarged-diameter portion 7a is about ±0.2 mm, so it suffers from the disadvantage that with such a machining accuracy, it is difficult to precisely and reproducibly suspend the starting preform 7 vertically by the chuck 14.

Consequently, as illustrated in FIG. 3A, the porous optical fiber preform 6 swings, along with rotation of the main shaft 4, inclined relative to the vertical line of the main shaft 4 at an angle θ of, for example, about ±0.2 degree. Therefore, the vitrified (dehydrated and sintered) optical fiber preform 6 bends as shown in FIG. 3B. An optical fiber produced from such an optical fiber preform 6 ends up with a core offset from the center line or a non-circular cladding causing degradation of the quality of the finally produced optical fiber.

FIG. 4A and FIG. 4B are vertical sectional views of the structure of an optical fiber preform suspending and supporting apparatus 5C of a type combining the pin supporting type and chuck supporting type viewed from two locations 90 degrees different from each other with respect to the axial center of the main shaft 4.

In the optical fiber preform suspending and supporting apparatus 5C illustrated in FIG. 4A and FIG. 4B, the lower end of the main shaft 4 is fitted into a cylindrical movable connector 17. Through holes 18 and 19 are formed in the two of them in the horizontal direction. A pin 12 is inserted into the through holes 18 and 19 to join them so that the movable connector 17 is supported by the main shaft 4 and is swingable around the pin 12. A holding portion 14 comprising a chuck is integrally formed at the bottom part of the movable connector 17 to hold the inclined portion 7b and enlarged-diameter portion 7a at the upper end of the starting preform 7. The inside of the holding portion 14 is shaped to accept the inclined portion 7b and enlarged-diameter portion 7a of the starting preform 7. An insertion space 15 open at one side is formed in the holding portion 14. A slit 16 for insertion of a starting preform is provided in a supporting portion 14a at the bottom of the insertion space 15 of the holding portion 14.

A number of carbon screws are screwed into the movable connector 17 and the holding portion 14 to adjust the orientation of the main shaft 4 and the center axis of the starting preform 7 to coincide.

In the optical fiber preform suspending and supporting apparatus 5C combining the pin supporting type and chuck supporting type illustrated in FIG. 4A and FIG. 4B, since the holding portion 14 is connected swingably with respect to the main shaft 4 by the pin 12 through the movable connector 17, it is not necessary to highly precisely machine the shapes of the enlarged-diameter portion 7a and the inclined portion 7b at the upper end of the starting preform 7. Even with a machining accuracy of about ±0.2 mm, the porous optical fiber preform 6 can be supported suspended without being inclined relative to the vertical line of the main shaft 4 utilizing its own weight.

However, rather complicated machining is required to shape the upper portion of the starting preform 7 into the inclined portion 7b and the enlarged-diameter portion 7a of the starting preform 7. Further, rather complicated machining is also required to shape the inside of the holding portion 14 into a shape mating with the inclined portion 7b and the enlarged-diameter portion 7a.

Further, since the pin 12 is made a thin one to pass through the through holes 18 and 19 formed in the main shaft 4 and the movable connector 17, it suffers from the disadvantage that it will easily deform when placed in a high temperature environment such as the furnace tube 1.

Because a number of carbon screws are used to adjust the orientation of the main shaft 4 and the position of the axial center of the starting preform 7 to coincide, not only do the movable connector 17 and the holding portion 14 become complicated in structure, but also positioning work is required.

SUMMARY OF THE INVENTION

An object of the present invention is to provide an optical fiber preform suspending and supporting apparatus able to prevent deformation of a pin placed in a high temperature environment and able to support a porous optical fiber preform without having an adverse influence on supports of the pin and without resulting in inclination relative to the vertical line of a rotating main shaft.

Another object of the present invention is to provide an optical fiber processing apparatus employing such an optical fiber preform suspending and supporting apparatus.

According to a first aspect of the present invention, there is provided an optical fiber preform suspending and supporting apparatus comprising a cylindrical movable connector for housing a columnar lower end of a main shaft, circular through holes formed in order to pass horizontally through a lower end of a main shaft and a movable connector, a columnar pin which passes through the through holes to connect the movable connector with the main shaft and supports the movable connector swingably with respect to the main shaft about the pin, and a holding portion having an insertion space integrally formed with the movable connector, positioned at the bottom portion of the movable connector, and housing a columnar enlarged-diameter portion of the upper end of a support of an optical fiber preform or a porous optical fiber preform and a supporting portion which defines the bottom surface of the insertion space, is formed an insertion slit for passing the support of an optical fiber preform or a porous optical fiber preform, and supports a flat bottom of the columnar enlarged-diameter portion of the support of an optical fiber preform or a porous optical fiber preform. In the above apparatus, the center lines of the main shaft, the movable connector, the holding portion, and the supporting portion coincide. The difference between the outside diameter of the columnar pin and the outside diameter of the lower end of the main shaft, the difference between the outside diameter of the lower end of the main shaft and the inside diameter of the movable connector, and the difference between the outside diameter of the enlarged-diameter portion of the support of an optical fiber preform or a porous optical fiber preform and the inside diameter of the holding portion are defined so that the movable connector is swingable around the axis of the pin.

Preferably, the outside diameter of the pin ranges from 25% to 50% of the outside diameter of the lower end of the main shaft. More preferably, the outside diameter of the pin ranges from 30% to 40% of the outside diameter of the lower end of the main shaft.

Preferably, the clearance between the through holes and the pin is not more than 1 mm and not less than 0.02 mm. More preferably, the clearance between the through holes and the pin is not more than 0.5 mm and not less than 0.02 mm.

Preferably, the clearance between the lower end of the main shaft and the movable connector is in the range of 0.3 mm to 1.0 mm.

Preferably, the clearance between the holding portion and the enlarged-diameter portion of the support is in the range of 0.3 mm to 1.0 mm.

According to a second aspect of the present invention, there is provided an optical fiber preform suspending and supporting apparatus comprising a cylindrical movable connector for housing a columnar lower end of a main shaft, first circular through holes formed so as to horizontally pass through a lower end of the main shaft and the movable connector, a first columnar pin which passes through the first through holes to connect the movable connector with the main shaft and supports the movable connector to the main shaft swingably around the first pin, a holding portion including a columnar upper portion inserted into the lower portion of the cylindrical movable connector, an insertion space for housing a columnar enlarged-diameter portion of the upper end of a support of an optical fiber preform or a porous optical fiber preform, and a supporting portion which defines the bottom surface of the insertion space, is formed with an insertion slit for passing the support of an optical fiber preform or a porous optical fiber preform, and supports a flat bottom of the columnar enlarged-diameter portion of the support of an optical fiber preform or a porous optical fiber preform, second circular through holes positioned below the first through holes formed in the movable connector, perpendicularly intersecting the orientation of the first through holes, and horizontally passing the columnar upper portion of the holding portion and the movable connector, and a second columnar pin which passes through the second through holes to connect the columnar upper portion of the holding portion with the movable connector and supports the holding portion to the movable connector swingably around the second pin. In this apparatus, the center lines of the main shaft, the movable connector, the holding portion, and the supporting portion coincide. The difference between the outside diameter of the first columnar pin and the outside diameter of the lower end of the main shaft, the difference between the outside diameter of the lower end of the main shaft and the inside diameter of the movable connector, the difference between the outside diameter of the second columnar pin and the outside diameter of the columnar upper portion of the holding portion, and the outside diameter of the enlarged-diameter portion of the support of an optical fiber preform or a porous optical fiber preform and the inside diameter of the supporting portion of the holding portion are defined so that the movable connector is able to swing around the axis of the first pin.

Preferably, the outside diameter of the first pin ranges from 25% to 50% of the outside diameter of the lower end of the main shaft. More preferably, the outside diameter of the first pin ranges from 30% to 40% of the outside diameter of the lower end of the main shaft.

In addition, preferably, the outside diameter of the second pin ranges from 25% to 50% of the outside diameter of the upper portion of the holding portion. More preferably, the outside diameter of the second pin ranges from 30% to 40% of the outside diameter of the upper portion of the holding portion.

Preferably, the clearance between the first through holes and the first pin is not more than 1 mm and not less than 0.02 mm. More preferably, the clearance between the first through holes and the first pin is not more than 0.5 mm and not less than 0.02 mm.

In addition, preferably, the clearance between the second through hole and the second pin is not more than 1 mm and not less than 0.02 mm. More preferably, the clearance between the second through hole and the second pin is not more than 0.5 mm and not less than 0.02 mm.

Preferably, the clearance between the lower end of the main shaft and the movable connector is in the range of 0.3 mm to 1.0 mm, the clearance between the columnar upper portion of the holding portion and the movable connector is in the range of 0.3 mm to 1.0 mm, and the clearance between the holding portion and the enlarged-diameter portion of the support is in the range of 0.3 mm to 1.0 mm.

Preferably, the inside diameter of the first through holes is equal to that of the second through holes and the outside diameter of the first pin is equal to that of the second pin.

According to a third aspect of the present invention, there is provided an optical fiber preform processing apparatus employing an optical fiber preform suspending and supporting apparatus of the first aspect of the present invention.

According to a fourth aspect of the present invention, there is provided an optical fiber preform processing apparatus employing an optical fiber preform suspending and supporting apparatus of the second aspect of the present invention.

BRIEF DESCRIPTION OF THE DRAWINGS

These and other objects and features of the present invention will become clearer from the following description of the preferred embodiments given with reference to the accompanying drawings, in which:

FIG. 3A is a vertical sectional view of a state where a porous optical fiber preform is supported and suspended by a chuck supporting type optical fiber preform suspending and supporting apparatus in an inclined state, while

FIG. 5A is a vertical sectional view of an optical fiber preform suspending and supporting apparatus 5A, FIG. 5B is a side view thereof, FIG. 5C is an enlarged partial sectional view showing the positional relation of through holes and a pin viewed from the line X1—X1 of the FIG. 5A, and FIG. 5D is an enlarged partial sectional view showing the positional relation of an enlarged-diameter portion of a starting preform and the inside diameter of a holding portion viewed from the line X2—X2 of the FIG. 5A; FIG. 6A is a vertical sectional view of an optical fiber preform suspending and supporting apparatus, FIG. 6B is a side view thereof, FIG. 6C is an enlarged partial sectional view showing the positional relation of first through holes and a first pin viewed from the line X1—X1 of the FIG. 6A, FIG. 6D is an enlarged partial sectional view showing the positional relation of an enlarged-diameter portion of a starting preform and the inside diameter of a holding portion viewed from the line X2—X2 of the FIG. 6A, FIG. 6E is an enlarged partial sectional view showing the positional relation of second through holes and a second pin viewed from the line X3—X3 of the FIG. 6A.

DESCRIPTION OF THE PREFERRED EMBODIMENTS

Below, preferred embodiments of the optical fiber preform suspending and supporting apparatus and optical fiber preform processing apparatus of the present invention will be described with reference to the accompanying drawings.

The following embodiments, as described previously with reference to FIG. 1 to FIG. 4, will be described by considering the case where an optical fiber preform suspending and supporting apparatus of the present invention is applied to a dehydration and sintering furnace as an example of an optical fiber preform processing apparatus.

Accordingly, the optical fiber preform suspending and supporting apparatus of the present invention is placed in a high temperature environment in the furnace tube 1 of the dehydration and sintering furnace described with reference to FIG. 1 and is used to support the porous optical fiber preform 6 in the furnace tube 1 when vitrifying the porous glass layer 8 for cladding of a porous optical fiber preform 6 including a core portion optical fiber preform which is used as a starting preform and a porous glass layer 8 for cladding deposited on the same.

First Embodiment

Figure 5A:
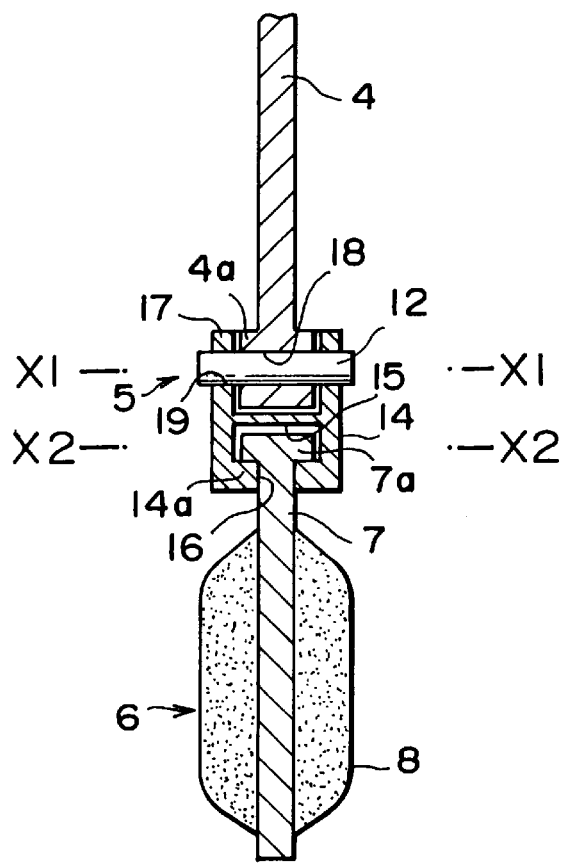
FIGS. 5A to 5D are views of an optical fiber preform suspending and supporting apparatus according to a first embodiment of the present invention, where
Figure 5B:
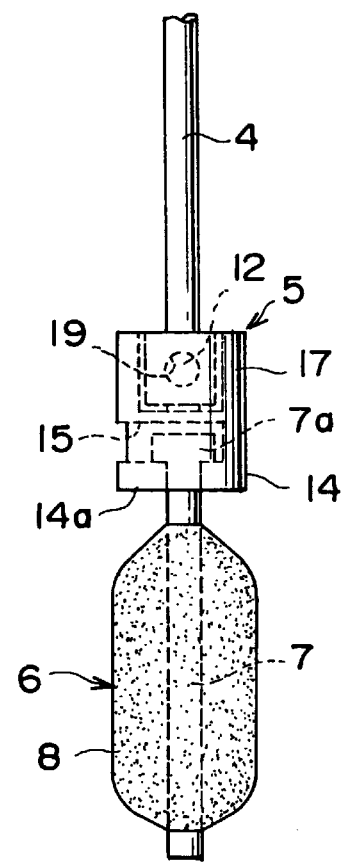
Figure 5C:
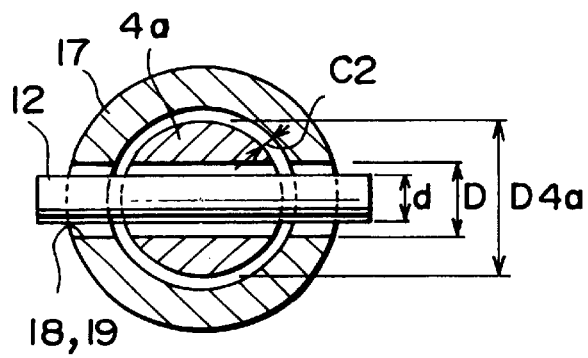
Figure 5D:
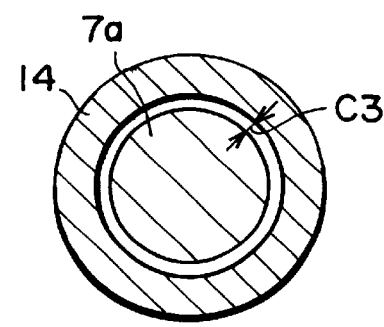

FIG. 5A to FIG. 5D are views of an optical fiber preform suspending and supporting apparatus according to a first embodiment of the present invention, where FIG. 5A is a vertical sectional view of an optical fiber preform suspending and supporting apparatus, FIG. 5B is a side view thereof, FIG. 5C is an enlarged partial sectional view showing the positional relation of through holes 18 and 19 and a pin 12 viewed from the line X1—X1 of the FIG. 5A, and FIG. 5D is an enlarged partial sectional view showing the positional relation of an enlarged-diameter portion 7a of a starting preform 7 and the inside diameter of a holding portion 14 viewed from the line X2—X2 of the FIG. 5A.

Figure 1:
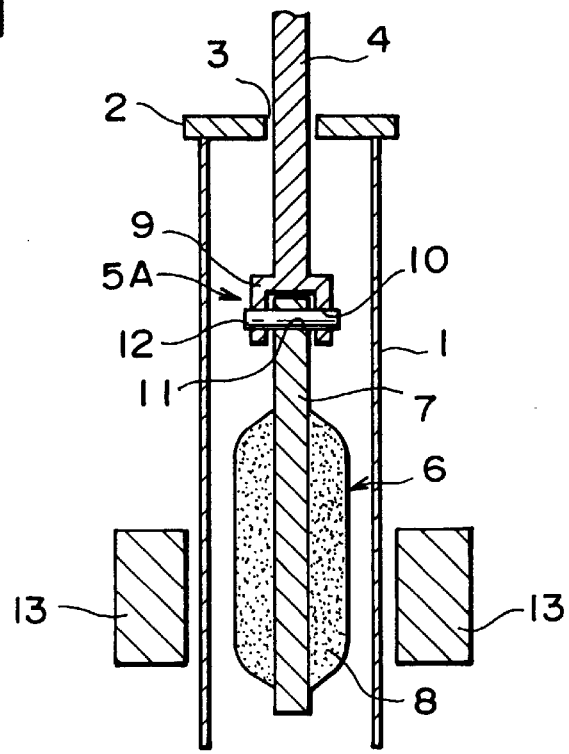
FIG. 1 is a vertical sectional view of a pin supporting type optical fiber preform suspending and supporting apparatus.

In the optical fiber preform suspending and supporting apparatus 5 according to the first embodiment of the present invention, a main shaft 4 able to pass through a hole 3 in an upper lid 2 is positioned above the upper lid 2 so as to be placed into the dehydration and sintering furnace illustrated in FIG. 1. The upper portion of the main shaft 4 is supported by a not illustrated rotation mechanism. The main shaft 4 is rotated by the rotation mechanism.

An enlarged-diameter portion 4a is provided at the lower end of the main shaft 4 which is positioned in the furnace tube 1 when the main shaft 4 is inserted into the furnace tube 1 of the dehydration and sintering furnace shown in FIG. 1.

A cylindrical movable connector 17 is fitted around the circumference of the enlarged-diameter portion 4a of the main shaft 4. Circular through holes 18 and 19 are formed in the horizontal direction in both of the enlarged-diameter portion 4a and the movable connector 17 at the portion where the enlarged-diameter portion 4a and the movable connector 17 are fitted with each other. A columnar pin 12 is inserted into the through holes 18 and 19 to join the lower end of the main shaft (the enlarged-diameter portion) 4a and the movable connector 17 so that the movable connector 17 is able to swing about the pin 12.

A holding portion 14 comprising a chuck is provided integrally at the bottom part of the movable connector 17 to hold an enlarged-diameter portion 7a of the upper end of the starting preform 7. A slit 16 for insertion of the starting preform is provided in a supporting portion 14a at the bottom of the insertion space 15 in the chuck 14.

In this way, the porous optical fiber preform 6 is held by the chuck 14 at the enlarged-diameter portion 7a of the starting portion 7. Since the movable connector 17 formed integrally with the chuck 14 is connected with the lower end (the enlarged-diameter portion) 4a of the main shaft 4 by the pin 12, the porous optical fiber preform 6 is supported by the main shaft 4 and is rotated along with the rotation of the main shaft 4. In addition, since the movable connector 17 is able to swing around the pin 12, the porous optical fiber preform 6 also swings around the pin 12 together with the movable connector 17.

In the same way as the furnace tube 1, the present optical fiber preform suspending and supporting apparatus 5 is also made of silica-based glass—which resists the heat of the dehydration and sintering furnace and prevents impurities from entering the porous optical fiber preform 6.

Compared with the optical fiber preform suspending and supporting apparatus 5A shown in FIG. 1, the optical fiber preform suspending and supporting apparatus 5 illustrated in FIG. 5A and FIG. 5B has the following differences and advantages in configuration.

(a) The lower end (enlarged-diameter portion) 4a is formed at the main shaft 4, the lower end 4a is fitted into the movable connector 17, a separate piece from the main shaft 4, and the lower end (enlarged-diameter portion) 4a and the movable connector 17 are connected by the pin 12. Because a pin is not directly used in the starting preform 7 for connection with the main shaft 4, it is unnecessary to form a through hole for passing a pin in the starting preform 7. Therefore, the strength of the starting preform 7 does not decline, and the pin 12 can be made thicker.

(b) A starting preform 7 formed with an enlarged-diameter portion 7a is connected with the main shaft 4 via the holding portion 14 formed integrally with the movable connector 17, and the movable connector 17 and the porous optical fiber preform 6 are able to swing around the pin 12. Therefore, it is not necessary to highly precisely machine the shape of the enlarged-diameter portion 7a of the upper end of the starting preform 7. Even with a machining accuracy of about ±0.2 mm, the porous optical fiber preform 6 can be supported without inclination relative to the vertical line of the main shaft 4 using its own weight.

(c) Because the integral assembly of the movable connector 17 and the holding portion 14 is separate from the main shaft 4, the integral assembly of the movable connector 17 and the holding portion 14, which is exposed to a high temperature environment, can be replaced independently from the main shaft 4.

Figure 2:
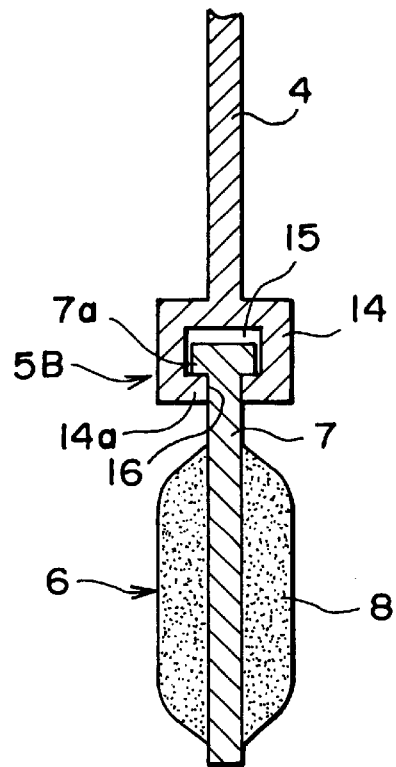
FIG. 2 is a vertical sectional view of a chuck supporting type optical fiber preform suspending and supporting apparatus.
Figure 3A:
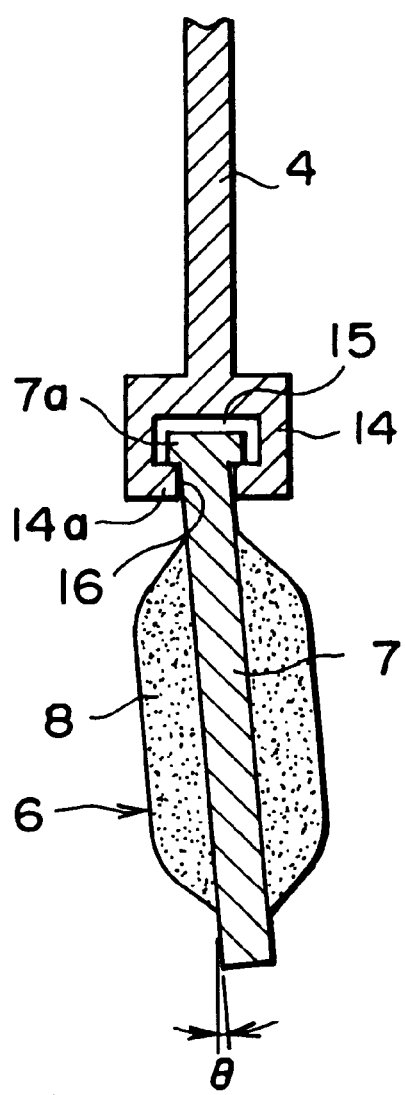
Figure 3B:
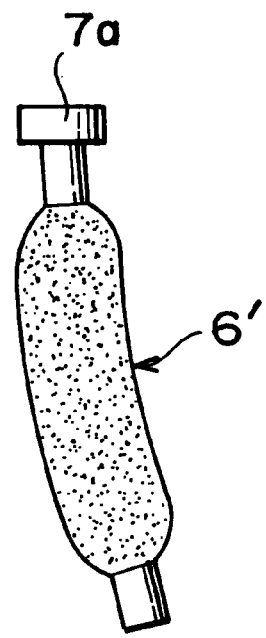
FIG. 3B is a sectional view of an optical fiber preform vitrified under the condition of FIG. 3A.

Compared with the optical fiber preform suspending and supporting apparatus 5B shown in FIG. 2, the optical fiber preform suspending and supporting apparatus 5 illustrated in FIG. 5A and FIG. 5B has the following configurational differences and advantages.

(aa) A lower end (enlarged-diameter portion) 4a is formed at a main shaft 4, but not formed integrally with the holding portion 14, so the structure of the main shaft 4 is simple.

(bb) A starting preform 7 formed with an enlarged-diameter portion 7a is connected with the main shaft 4 via the holding portion 14 formed integrally with the movable connector 17, and the movable connector 17 and the porous optical fiber preform 6 are able to swing around the pin 12. Therefore, it is not necessary to highly precisely machine the shape of the enlarged-diameter portion 7a of the upper end of the starting preform 7. Even with a machining accuracy of about ±0.2 mm, the porous optical fiber preform 6 can be supported without inclination relative to the vertical line of the main shaft 4 using its own weight.

Figure 4A:
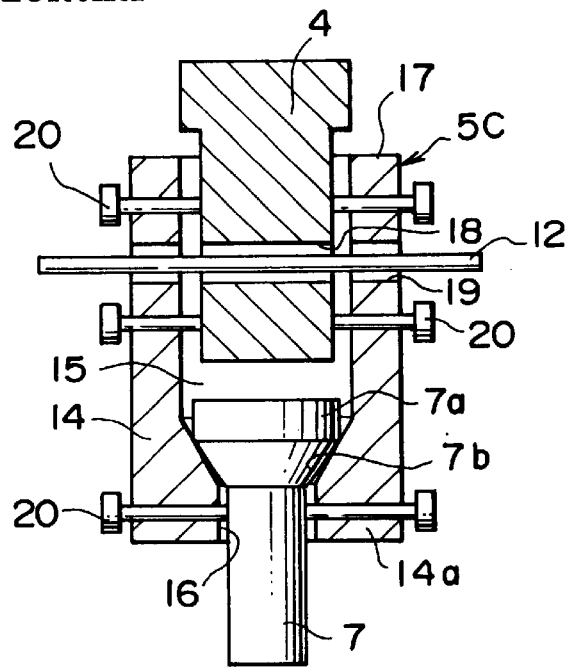
FIG. 4A and FIG. 4B are vertical sectional views of an optical fiber preform suspending and supporting apparatus combining a pin supporting type and a chuck supporting type observed from two locations 90 degrees different from each other with respect to the axial center of the main shaft.
Figure 4B:
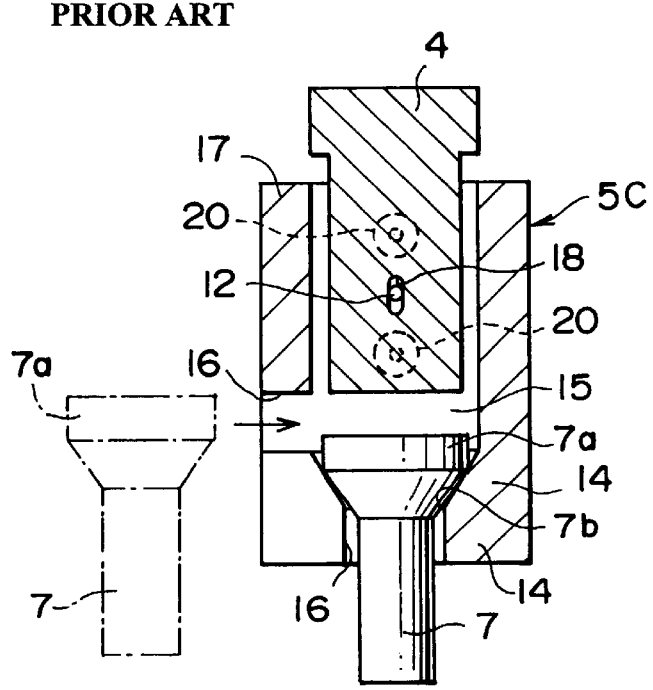

Compared with the optical fiber preform suspending and supporting apparatus 5C shown in FIG. 4A and FIG. 4B, the optical fiber preform suspending and supporting apparatus 5 illustrated in FIG. 5A and FIG. 5B has the following configurational differences and advantages.

(aaa) Because the starting preform 7 does not have an inclined portion 7b, machining the shape of the end of the starting preform 7 is simple. The shape of the inside of the holding portion 14 is also simple.

(bbb) The enlarged-diameter portion 7a of the starting preform 7 is stably supported by the supporting portion 14a, and the center axes of the main shaft 4 and the starting preform 7 coincide, so the carbon screws 20 used in the optical fiber preform suspending and supporting apparatus 5C for adjustments to align the orientation of the main shaft 4 and the axial center of the starting preform 7 are not necessary.

(ccc) Because the holding portion 14 is swingably connected to the main shaft 4 via the movable connector 17 by the pin 12 inserted into the lower end (enlarged-diameter portion) 4a, which is thicker than the main shaft 4, the outside diameter of the pin 12 can be made large and thus the pin 12 placed in the high temperature environment of the furnace tube 1 is resistant to thermally deformation.

Particularly, in the optical fiber preform suspending and supporting apparatus 5 according to the present embodiment, as shown in FIG. 5C, the outside diameter d of the columnar pin 12 is defined to be 25% to 50% of the outside diameter D4a of the enlarged-diameter portion 4a at the lower end of the main shaft 4. Preferably, the outside diameter d of the pin 12 is in the range of 30% to 40% of the outside diameter D4a of the enlarged-diameter portion 4a.

When the outside diameter d of the pin 12 is defined to be 25% to 50% of the outside diameter D4a of the enlarged-diameter portion 4a at the lower end of the main shaft 4, the diameter of the pin 12 can be suitably made large, so the thermal deformation of the pin 12 is preventable. Further there is no adverse influence either, such as degradation of the mechanical strength, on the lower end (enlarged-diameter portion) 4a of the main shaft 4 through which the pin 12 passes and is supported.

In the optical fiber preform suspending and supporting apparatus 5, since the holding portion 14 is connected with the enlarged-diameter portion 4a by the pin 12 via the movable connector 17 so as to be swingable around the pin 12, it is not necessary to highly precisely machine the shape of the enlarged-diameter portion 7a of the upper end of the starting preform 7. Even with a machining accuracy of about ±0.2 mm, the porous optical fiber preform 6 can be supported without inclination relative to the vertical line of the main shaft 4 by using its own weight. As a result, the optical fiber produced from an optical fiber preform obtained by vitrifying the above porous optical fiber preform 6 will be free from the core offset and non-circular cladding described with reference to FIG. 3A and FIG. 3B and degradation of quality can be prevented.

In addition, as illustrated in FIG. 5C, the clearance C1 between the through holes 18 and 19 and the pin 12 is not more than 1 mm and not less than 0.02 mm, preferably not more than 0.5 mm and not less than 0.02

If the clearance C1 between the through holes 18 and 19 and the pin 12 is too small, smooth swinging of the movable connector 17 is undesirably interfered with. If the clearance C1 between the through holes 18 and 19 and the pin 12 is too large, when moving an optical fiber preform 6, unnecessary swinging takes place making movement difficult. In addition, if the pin 12 is too thick, simply using such a pin will cause a decline of the mechanical strength of the lower end (enlarged-diameter portion) 4a of the main shaft 4 through which the pin 12 passes. Alternatively, the supporting portion of the pin 12 (the enlarged-diameter portion 4a) has to be made large in size, causing a rise of cost. Therefore, the clearance C1 between the through holes 18 and 19 and the pin 12 preferably is not more than 1 mm and not less than 0.02 mm, more preferably, not more than 0.5 mm and not less than 0.02 mm.

As shown in FIG. 5C and FIG. 5D, the clearance C2 between the enlarged-diameter portion 4a of the main shaft 4 and the movable connector 17 and the clearance C3 between the holding portion 14 and the enlarged-diameter portion 7a of the starting preform 7 are 0.3 mm to 1.0 mm or so, respectively.

If the clearance C2 between the enlarged-diameter portion 4a of the main shaft 4 and the movable connector 17 and the clearance C3 between the holding portion 14 and the enlarged-diameter portion 7a of the starting preform 7 are too small, the movable range becomes too small to accomplish the purpose. If too large, a center offset arises due to the positional displacement in the insertion space 15. Consequently, the clearance C2 between the enlarged-diameter portion 4a of the main shaft 4 and the movable connector 17 and the clearance C3 between the holding portion 14 and the enlarged-diameter portion 7a of the starting preform 7, as in the above description, are preferably 0.3 mm to 1.0 mm or so, respectively.

Table 1 shows an example of the apparatus.

TABLE 1

| | |
|---|---|
| Clearance between lower end (enlarged-diameter portion) 4a of main shaft 4 and movable connector 17 | 1 mm |
| Clearance between through holes 18 and 19 and pin 12 | 0.3 mm |
| Diameter of enlarged-diameter portion 7a of starting preform 7 | 80 mm |
| Inside diameter of holding portion 14 | 90 mm |
| Internal temperature in furnace tube | About 1600° C. |
| Material of starting preform 7 | Silica-based glass |
| Material of pin 12 | Silica-based glass |
| Material of movable connector 17 | Silica-based glass |
| Material of holding portion 14 | Silica-based glass |

As shown above, in the optical fiber preform suspending and supporting apparatus 5 according to the first embodiment of the present invention, because the outside diameter d of the pin 12 is defined to be 25% to 50% (preferably 30% to 40%) of the outside diameter D4a of the lower end (the enlarged-diameter portion) 4a of the main shaft 4, the diameter of the pin 12 can be suitably made large, and thus thermal deformation of the pin 12 is preventable. Further, there is no adverse influence, such as degradation of the mechanical strength, on the supporting portion of the pin 12.

Note that the main shaft 4, as shown in FIG. 5A to FIG. 5C, is not only configured to have a portion of an enlarged diameter (the enlarged-diameter portion 4a) at the lower end, but also can be made uniform in thickness even at the lower end. In this case, the diameter of the pin 12 is also set to 25% to 50% (preferably, 30% to 40%) of the outside diameter of the lower end of the main shaft 4 of uniform thickness.

Because the movable connector 17 is swingably supported by the main shaft 4 using the pin 12, the optical fiber preform can be supported without an inclination relative to the vertical line of the main shaft 4 by using its own weight.

Second Embodiment

Figure 6A:
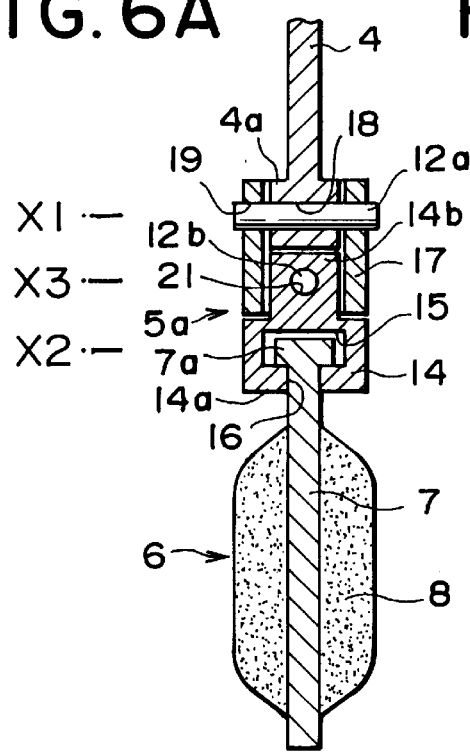
FIGS. 6A to 6E are views of an optical fiber preform suspending and supporting apparatus according to a second embodiment of the present invention, where
Figure 6B:
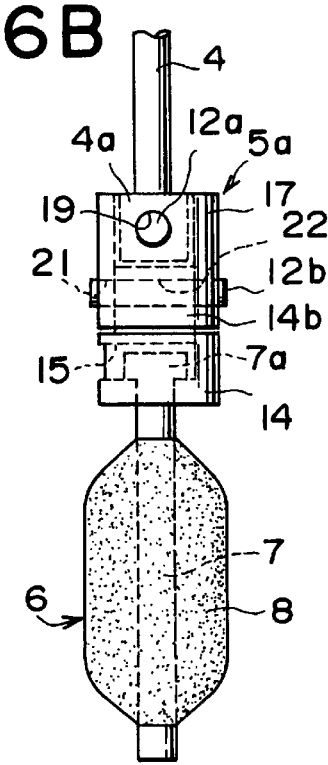
Figure 6C:
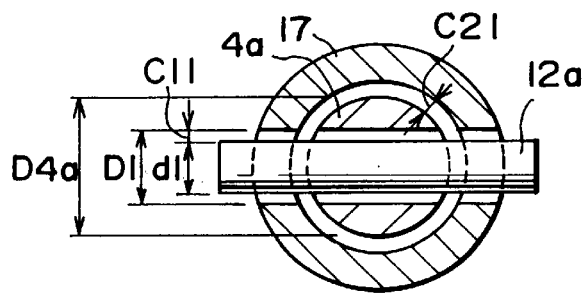
Figure 6D:
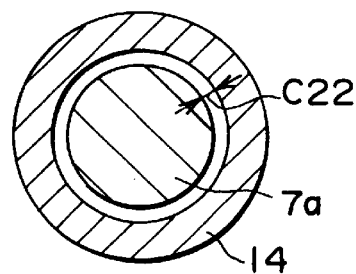
Figure 6E:
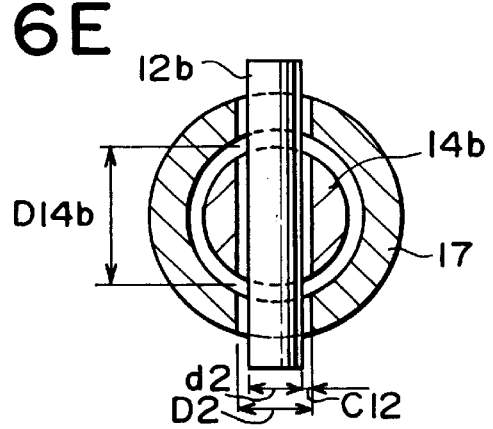

FIG. 6A to FIG. 6E are views of an optical fiber preform suspending and supporting apparatus 5a according to a second embodiment of the present invention, where FIG. 6A is a vertical sectional view of the optical fiber preform suspending and supporting apparatus 5a, FIG. 6B is a side view thereof, FIG. 6C is an enlarged partial sectional view showing the positional relation of the first through holes 18 and 19 and the first pin 12a viewed from the line X1—X1 of the FIG. 6A, FIG. 6D is an enlarged partial sectional view showing the positional relation of an enlarged-diameter portion 7a of a starting preform 7 and the inside diameter of a holding portion 14 viewed from the line X2—X2 of the FIG. 6A, and FIG. 6E is an enlarged partial sectional view showing the positional relation of the second through holes 21 and 22 and the second pin 12b viewed from the line X3—X3 of the FIG. 6A.

There are the following differences when comparing the optical fiber preform suspending and supporting apparatus 5a according to the second embodiment with the optical fiber preform suspending and supporting apparatus 5 according to the first embodiment. In the optical fiber preform suspending and supporting apparatus 5a, the movable connector 17 is separate from the holding portion 14. As in the first embodiment, the movable connector 17 is swingably supported at the lower end (enlarged-diameter diameter portion) 4a of the main shaft 4 by the first through holes 18 and 19 and the first pin 12a. Moreover, the holding portion 14 is also swingably supported at the movable connector 17 by the second through holes 21 and 22 and the second pin 12b.

In the optical fiber preform suspending and supporting apparatus 5a according to the second embodiment, a cylindrical movable connector 17 is fitted with an enlarged-diameter portion 4a of the lower end of the main shaft 4. The first circular through holes 18 and 19 are formed in the horizontal direction in both of the enlarged-diameter portion 4a and the movable connector 17 at the portion where the enlarged-diameter portion 4a and the movable connector 17 are fitted with each other. The first pin 12a is inserted into the first through holes 18 and 19, whereby the movable connector 17 is connected swingably around the first pin 12a. A columnar upper portion 14b of the holding portion 14, which comprises a chuck for holding the enlarged-diameter portion 7a of the upper end of the starting preform 7, is fitted in the lower portion of the cylindrical movable connector 17. Second circular through holes 21 and 22 are formed horizontally in a direction intersecting the first pin (in the present example, perpendicularly intersecting the first pin) in both of the movable connector 17 and the upper portion 14b of the holding portion 14 at the portion where the movable connector 17 and the upper portion 14b of the holding portion 14 are fitted with each other. The second pin 12b is inserted in the second through holes 21 and 22, whereby the holding portion 14 is swingably connected around the second pin 12b.

Preferably, the outside diameter D14b of the columnar upper portion 14b of the holding portion 14 is equal to the outside diameter D4a of the enlarged-diameter portion 4a of the main shaft 4.

The present optical fiber preform suspending and supporting apparatus 5a is also made of silica-based glass to prevent impurities from entering the porous optical fiber preform 6.

Compared with the optical fiber preform suspending and supporting apparatus 5A, 5B, and 5C shown in FIG. 1 to FIG. 4, the optical fiber preform suspending and supporting apparatus 5a illustrated in FIG. 6A and FIG. 6D has the following differences and advantages in configuration.

(a) Because the starting preform 7 does not have an inclined portion 7b, machining the shape of the end of the starting preform 7 is simple. The shape of the inside of the holding portion 14 is also simple.

(b) The enlarged-diameter portion 7a of the starting preform 7 is stably supported by the supporting portion 14a and the center axes of the main shaft 4 and the starting preform 7 coincide, so the carbon screws 20 used in the optical fiber preform suspending and supporting apparatus 5C for adjustment to align the orientation of the main shaft 4 and the axial center of the starting preform 7 are not necessary.

(c) Because the holding portion 14 is swingably connected to the main shaft 4 via the movable connector 17 by the pin 12a at the lower end 4a, which is thicker than the main shaft 4, the outside diameter of the pin 12a can be made large and thus the pin 12a placed in the high temperature environment such as the furnace tube 1 is resistant to thermally deformation.

(d) Because the main shaft 4 is connected to the enlarged-diameter portion 7a of the starting preform 7 through the holding portion 14 by the second pin 12b, the outside diameter of the second pin 12b can be made large, thus the second pin 12b, which is placed in the high temperature environment of the furnace tube 1, is resistant to thermal deformation.

Particularly, in the optical fiber preform suspending and supporting apparatus 5a according to the present embodiment, as shown in FIG. 6C, the outside diameter d1 of the columnar first pin 12a is defined to be 25% to 50% of the outside diameter D4a of the enlarged-diameter portion 4a at the lower end of the main shaft 4, preferably the outside diameter d1 of the first pin 12a is in the range of 30% to 40% of the outside diameter D4a of the enlarged-diameter portion 4a.

Note that the main shaft 4, as shown in FIG. 6A to FIG. 6C, is not only configured to have a portion of an enlarged diameter (the enlarged-diameter portion) 4a at the lower end of the main shaft 4, but can also be made uniform in thickness even at the lower end. In this case, the diameter of the first pin 12a is also set to 25% to 50% (preferably 30% to 40%) of the outside diameter of the lower end of the main shaft 4 of uniform thickness.

Similarly, as shown in FIG. 6E, the outside diameter d2 of the columnar second pin 12b is defined to be 25% to 50% of the outside diameter D14b of the columnar upper portion 14b of the holding portion 14. Preferably, the outside diameter d2 of the second pin 12b is in the range of 30% to 40% of the outside diameter D14b of the columnar upper portion 14b of the holding portion 14.

When the outside diameter d1 of the first pin 12a is defined to be 25% to 50% (preferably 30% to 40%) of the outside diameter D4a of the enlarged-diameter portion 4a at the lower end of the main shaft 4 and similarly the outside diameter d2 of the second pin 12b is defined to be 25% to 50% (preferably 30% to 40%) of the outside diameter D14b of the columnar upper portion 14b of the holding portion 14, the diameters of the first and second pins 12a and 12b can be suitably made large, and the thermal deformation of the first and second pins 12a and 12b is preventable. Further, there is no adverse influence such as degradation of the mechanical strength on the lower end (enlarged-diameter portion) 4a of the main shaft 4 and the columnar upper portion 14b of the holding portion 14 that support the first and second pins 12a and 12b.

In the optical fiber preform suspending and supporting apparatus 5a, the movable connector 17 fitted with the enlarged-diameter portion 4a at the lower end of the main shaft 4 is connected by the first pin 12a while being swingable around the first pin 12a. Further, the upper portion 14a of the holding portion 14 fitted into the lower portion of the movable connector 17 is connected by the second pin 12b while being swingable around the second pin 12b, so in the present embodiment, the porous optical fiber preform 6 can be supported without inclination relative to the vertical line of the main shaft 4, that is, the Z-axis, as well as the X-axis and Y-axis, using its own weight. As a result, the optical fiber produced from an optical fiber preform obtained by vitrifying the above porous optical fiber preform 6 is free from the core offset and non-circular cladding described with reference to FIG. 3A and FIG. 3B and deterioration of quality can be prevented.

As illustrated in FIG. 6C, the clearance C11 between the first through holes 18 and 19 and the first pin 12a is not more than 1 mm and not less than 0.02 mm, preferably not more than 0.5 mm and not less than 0.02 mm.

Similarly, as illustrated in FIG. 6E, the clearance C12 between the second through holes 21 and 22 and the second pin 12b is not more than 1 mm and not less than 0.02 mm, preferably not more than 0.5 mm and not less than 0.02 mm.

If the clearance C11 between the first through holes 18 and 19 and the first pin 12a is too small, smooth swinging of the movable connector 17 is undesirably interfered with. If the clearance C1 between the first through holes 18 and 19 and the first pin 12a is too large, unnecessary swinging takes place when moving an optical fiber preform 6 making the movement difficult. In addition, if the first pin 12a is too thick, simply using such a pin will cause a decline of the mechanical strength of the lower end (enlarged-diameter portion) 4a of the main shaft 4 through which the first pin 12a passes. Alternatively, the portion supporting the first pin 12a (the enlarged-diameter portion 4a) has to be made large, causing a rise of cost. Therefore, the clearance C11 between the first through holes 18 and 19 and the first pin 12a, as described above, is not more than 1 mm and not less than 0.02 mm, preferably not more than 0.5 mm and not less than 0.02 mm.

The same is true for the clearance C12 between the second through holes 21 and 22 and the second pin 12b.

Further, as shown in FIG. 6C, the clearance C21 between the enlarged-diameter portion 4a of the main shaft 4 and the movable connector 17 and, as shown in FIG. 6D, the clearance C22 between the holding portion 14 and the enlarged-diameter portion 7a of the starting preform 7 are 0.3 mm to 1.0 mm or so.

If the clearance C21 between the enlarged-diameter portion 4a of the main shaft 4 and the movable connector 17 and the clearance C22 between the holding portion 14 and the enlarged-diameter portion 7a of the starting preform 7 are too small, the movable range becomes too small to accomplish the purpose. If too large, a center offset arises due to the positional displacement in the insertion space 15. Consequently, the clearance C21 between the enlarged-diameter portion 4a of the main shaft 4 and the movable connector 17 and the clearance C22 between the holding portion 14 and the enlarged-diameter portion 7a of the starting preform 7, as in the above description, are preferably 0.3 mm to 1.0 mm or so.

Further, preferably the clearance between the columnar upper portion 14b of the holding portion 14 and the movable connector 17 is in the range of 0.3 mm to 1.0 mm.

In addition, preferably the inside diameter of the first through holes 18 and 19 is equal to that of the second through holes 21 and 22, and the outside diameter of the first pin 12a is equal to that of the second pin 12b.

Table 2 shows an example of the apparatus.

TABLE 2

| | |
|---|---|
| Clearance between lower end (enlarged-diameter portion) 4a of main shaft 4 and movable connector 17 | 1 mm |
| Clearance between through holes 18 and 19 and first pin 12a | 0.3 mm |
| Clearance between through holes 21 and 22 and second pin 12b | 0.3 mm |
| Diameter of enlarged-diameter portion 7a of starting preform 7 | 80 mm |

TABLE 2-continued

| | |
|---|---|
| Inside diameter of holding portion 14 | 90 mm |
| Internal temperature in furnace tube (maximum temperature) | About 1600° C. |
| Material of starting preform 7 | Silica-based glass |
| Material of first and second pins 12 | Silica-based glass |
| Material of movable connector 17 | Silica-based glass |
| Material of holding portion 14 | Silica-based glass |

As shown above, in the optical fiber preform suspending and supporting apparatus 5a according to the second embodiment of the present invention, because the outside diameter d1 of the first pin 12a is defined to be 25% to 50% (preferably 30% to 40%) of the outside diameter D4a of the lower end (the enlarged-diameter portion) 4a of the main shaft 4 and the outside diameter d2 of the second pin 12b is defined to be 25% to 50% (preferably 30% to 40%) of the outside diameter D14b of the upper portion of the holding portion 14, the diameters d1 and d2 of the first and second pins 12a and 12b can be suitably made large, and the thermal deformation of the first and second pins 12a and 12b is preventable. Further there is no adverse influence, such as degradation of the mechanical strength, on the portions supporting the first and second pin 12a and 12b. Further, the movable connector 17 is swingably supported by the first pin 12a and the holding portion 14 is swingably supported by the second pin 12b, so the optical fiber preform 6 can be supported without inclination relative to the vertical line of the main shaft 4 by using its own weight.

Modification 1

In the first and second embodiments, the holding portion 14 is designed not to include a movable portion, but it can also have a structure in which a number of supporting portions 14a are provided and their upper ends are movably supported by supporting members to allow the enlarged-diameter portion 7a at the end of the starting preform 7 to be held and released freely.

Modification 2

In the first and second embodiments, a portion having an enlarged diameter (the enlarged-diameter portion) 4a is provided only at the lower end of the main shaft 4, but the main shaft 4 can also be designed so that nearly all of it is as thick as its lower end.

Other Embodiments

Above, descriptions were made of a case where the optical fiber preform suspending and supporting apparatus of the present invention was applied to a dehydration and sintering furnace as an example of an optical fiber preform processing apparatus, but the optical fiber preform suspending and supporting apparatus of the present invention is not limited to a dehydration and sintering furnace. It can also be applied to other optical fiber preform processing apparatuses.

Other optical fiber preform processing apparatuses may include (1) a porous optical fiber preform producing apparatus for synthesizing and depositing a core portion porous optical fiber preform and a cladding portion porous optical fiber preform on a seed rod used as a starting preform by a VAD method, (2) a porous optical fiber preform producing apparatus for synthesizing a core portion porous optical fiber preform on a seed rod by an OVD method, when synthesizing a core portion porous optical fiber preform on a seed, (3) a dehydration and sintering furnace for vitrifying a core portion porous optical fiber preform after a core portion porous optical fiber preform is synthesized by an OVD method on a seed rod used as a starting preform, and (4) a porous optical fiber preform producing apparatus for synthesizing and depositing a cladding use optical fiber preform by using a vitrified optical fiber preform as a starting preform by a VAD method, and so on. In these apparatuses, the optical fiber preform suspending and supporting apparatus of the present invention is used to hold a starting preform and a porous optical fiber preform in a high temperature environment in the vertical direction.

In the present invention, as described above, the starting preforms are different in different optical fiber preform producing processes. For example, when vitrifying a cladding portion porous optical fiber preform in a dehydration and sintering furnace, the starting preform 7 is comprised of a seed rod on which a core use optical fiber preform is deposited. When synthesizing and depositing a core portion porous optical fiber preform and a cladding portion porous optical fiber preform on a seed rod by a VAD method, the starting preform is the seed rod. Note that in the claims, in order to avoid complexity in interpretation of the meaning of this term, the starting preform 7 is expressed as a support.

In the embodiments described above, the suspending and supporting apparatus of the present invention is described taking as an example the case where a porous optical fiber preform is suspended. Of course, the object that can be suspended by the suspending and supporting apparatus of the present invention is not limited to a porous optical fiber preform. The apparatus may be used when suspending numerous other objects.

While the invention has been described with reference to specific embodiment chosen for purpose of illustration, it should be apparent that numerous modifications could be made thereto by those skilled in the art without departing from the basic concept and scope of the invention.

What is claimed is:

1. An optical fiber preform suspending and supporting apparatus comprising:

a cylindrical movable connector for housing a columnar lower end of a main shaft;

circular through holes formed in order to pass horizontally through a lower end of a main shaft and a movable connector;

a columnar pin which passes through the through holes to connect the movable connector with the main shaft and supports the movable connector swingably with respect the main shaft about the pin; and a holding portion having an insertion space integrally formed with the movable connector, positioned at the bottom portion of the movable connector, and housing a columnar enlarged-diameter portion of the upper end of a support of an optical fiber preform or a porous optical fiber preform and a supporting portion which defines the bottom surface of the insertion space, having an insertion slit for passing the support of an optical fiber preform or a porous optical fiber preform, and supporting a flat bottom of the columnar enlarged-diameter portion of the support of an optical fiber preform or a porous optical fiber preform, wherein the center lines of the main shaft, the movable connector, the holding portion, and the supporting portion coincide, and the difference between the outside diameter of the columnar pin and the outside diameter of the lower end of the main shaft, the difference between the outside diameter of the lower end of the main shaft and the inside diameter of the movable connector, and the difference between the outside diameter of the enlarged-diameter portion of the support of an optical fiber preform or a porous optical fiber preform and the inside diameter of the holding portion are defined so that the movable connector is swingable around the axis of the pin.

2. An optical fiber preform suspending and supporting apparatus as set forth in claim 1, wherein the outside diameter of said pin ranges from 25% to 50% of the outside diameter of the lower end of said main shaft.

3. An optical fiber preform suspending and supporting apparatus as set forth in claim 2, wherein the outside diameter of said pin ranges from 30% to 40% of the outside diameter of the lower end of said main shaft.

4. An optical fiber preform suspending and supporting apparatus as set forth in claim 1, wherein the clearance between said through holes and said pin is not more than 1 mm and not less than 0.02 mm.

5. An optical fiber preform suspending and supporting apparatus as set forth in claim 4, wherein the clearance between said through holes and said pin is not more than 0.5 mm and not less than 0.02 mm.

6. An optical fiber preform suspending and supporting apparatus as set forth in claim 1, wherein the clearance between the lower end of said main shaft and said movable connector is in the range of 0.3 mm to 1.0 mm.

7. An optical fiber preform suspending and supporting apparatus as set forth in claim 1, wherein the clearance between said holding portion and said enlarged-diameter portion of said support is in the range of 0.3 mm to 1.0 mm.

8. An optical fiber preform suspending and supporting apparatus comprising:

a cylindrical movable connector for housing a columnar lower end of a main shaft;

first circular through holes formed so as to horizontally pass through a lower end of the main shaft and the movable connector;

a first columnar pin which passes through the first through holes to connect the movable connector with the main shaft and supports the movable connector to the main shaft swingably around the first pin;

a holding portion including a columnar upper portion inserted into the lower portion of the cylindrical movable connector, an insertion space for housing a columnar enlarged-diameter portion of the upper end of a support of an optical fiber preform or a porous optical fiber preform, and a supporting portion which defines the bottom surface of the insertion space, having with an insertion slit for passing the support of an optical fiber preform or a porous optical fiber preform, and supporting a flat bottom of the columnar enlarged-diameter portion of the support of an optical fiber preform or a porous optical fiber preform;

second circular through holes positioned below the first through holes formed in the movable connector, perpendicularly intersecting the orientation of the first through holes, and horizontally passing the columnar upper portion of the holding portion and the movable connector; and a second columnar pin which passes through the second through holes to connect the columnar upper portion of the holding portion with the movable connector and supports the holding portion to the movable connector swingably around the second pin, wherein the center lines of the main shaft, the movable connector, the holding portion, and the supporting portion coincide and the difference between the outside diameter of the first columnar pin and the outside diameter of the lower end of the main shaft, the difference between the outside diameter of the lower end of the main shaft and the inside diameter of the movable connector, the difference between the outside diameter of the second columnar pin and the outside diameter of the columnar upper portion of the holding portion, and the outside diameter of the enlarged-diameter portion of the support of an optical fiber preform or a porous optical fiber preform and the inside diameter of the supporting portion of the holding portion are defined so that the movable connector is able to swing around the axis of the first pin.

9. An optical fiber preform suspending and supporting apparatus as set forth in claim 8, wherein the outside diameter of said first pin ranges from 25% to 50% of the outside diameter of the lower end of said main shaft.

10. An optical fiber preform suspending and supporting apparatus as set forth in claim 9, wherein the outside diameter of said first pin ranges from 30% to 40% of the outside diameter of the lower end of said main shaft.

11. An optical fiber preform suspending and supporting apparatus as set forth in claim 8, wherein the outside diameter of said second pin ranges from 25% to 50% of the outside diameter of the upper portion of said holding portion.

12. An optical fiber preform suspending and supporting apparatus as set forth in claim 11, wherein the outside diameter of said second pin ranges from 30% to 40% of the outside diameter of the upper portion of said holding portion.

13. An optical fiber preform suspending and supporting apparatus as set forth in claim 8, wherein the clearance between said first through holes and said first pin is not more than 1 mm and not less than 0.02 mm.

14. An optical fiber preform suspending and supporting apparatus as set forth in claim 13, wherein the clearance between said first through holes and said first pin is not more than 0.5 mm and not less than 0.02 mm.

15. An optical fiber preform suspending and supporting apparatus as set forth in claim 8, wherein the clearance between said second through holes and said second pin is not more than 1 mm and not less than 0.02 mm.

16. An optical fiber preform suspending and supporting apparatus as set forth in claim 15, wherein the clearance between said second through holes and said second pin is not more than 0.5 mm and not less than 0.02 mm.

17. An optical fiber preform suspending and supporting apparatus as set forth in claim 8, wherein the clearance between the lower end of said main shaft and said movable connector is in the range of 0.3 mm to 1.0 mm.

18. An optical fiber preform suspending and supporting apparatus as set forth in claim 8, wherein the clearance between the columnar upper portion of said holding portion and said movable connector is in the range of 0.3 mm to 1.0 mm.

19. An optical fiber preform suspending and supporting apparatus as set forth in claim 8, wherein the clearance between said holding portion and said enlarged-diameter portion of the support is in the range of 0.3 mm to 1.0 mm.

20. An optical fiber preform suspending and supporting apparatus as set forth in claim 8, wherein the inside diameter of said first through holes is substantially equal to that of said second through holes, and the outside diameter of said first pin is substantially equal to that of said second pin.

21. An optical fiber preform processing apparatus comprising:

a region for treatment of an optical fiber preform at a high temperature;

a rotating and holding means including a main shaft and supporting and rotating an optical fiber preform positioned in said region; and an optical fiber preform suspending and supporting apparatus provided between the optical fiber preform and the main shaft of the rotating and holding means, said optical fiber preform suspending and supporting apparatus comprising:

a cylindrical movable connector for housing a columnar lower end of a main shaft;

circular through holes formed in order to pass horizontally through a lower end of a main shaft and a movable connector;

a columnar pin which passes through the through holes to connect the movable connector with the main shaft and supports the movable connector swingably with respect the main shaft about the pin; and a holding portion having an insertion space integrally formed with the movable connector, positioned at the bottom portion of the movable connector, and housing a columnar enlarged-diameter portion of the upper end of a support of an optical fiber preform or a porous optical fiber preform and a supporting portion which defines the bottom surface of the insertion space, having an insertion slit for passing the support of an optical fiber preform or a porous optical fiber preform, and supporting a flat bottom of the columnar enlarged-diameter portion of the support of an optical fiber preform or a porous optical fiber preform, wherein the center lines of the main shaft, the movable connector, the holding portion, and the supporting portion coincide, and the difference between the outside diameter of the columnar pin and the outside diameter of the lower end of the main shaft, the difference between the outside diameter of the lower end of the main shaft and the inside diameter of the movable connector, and the difference between the outside diameter of the enlarged-diameter portion of the support of an optical fiber preform or a porous optical fiber preform and the inside diameter of the holding portion are defined so that the movable connector is swingable around the axis of the pin.

22. An optical fiber preform processing apparatus comprising:

a region for treatment of an optical fiber preform at a high temperature;

a rotating and holding means including a main shaft and supporting and rotating an optical fiber preform positioned in said region; and an optical fiber preform suspending and supporting apparatus provided between the optical fiber preform and the main shaft of the rotating and holding means, said optical fiber preform suspending and supporting apparatus comprising:

a cylindrical movable connector for housing a columnar lower end of a main shaft;

first circular through holes formed so as to horizontally pass through a lower end of the main shaft and the movable connector;

a first columnar pin which passes through the first through holes to connect the movable connector with the main shaft and supports the movable connector to the main shaft swingably around the first pin;

a holding portion including a columnar upper portion inserted into the lower portion of the cylindrical movable connector, an insertion space for housing a columnar enlarged-diameter portion of the upper end of a support of an optical fiber preform or a porous optical fiber preform, and a supporting portion which defines the bottom surface of the insertion space, having with an insertion slit for passing the support of an optical fiber preform or a porous optical fiber preform, and supporting a flat bottom of the columnar enlarged-diameter portion of the support of an optical fiber preform or a porous optical fiber preform;

second circular through holes positioned below the first through holes formed in the movable connector, perpendicularly intersecting the orientation of the first through holes, and horizontally passing the columnar upper portion of the holding portion and the movable connector; and a second columnar pin which passes through the second through holes to connect the columnar upper portion of the holding portion with the movable connector and supports the holding portion to the movable connector swingably around the second pin, wherein the center lines of the main shaft, the movable connector, the holding portion, and the supporting portion coincide, and the difference between the outside diameter of the first columnar pin and the outside diameter of the lower end of the main shaft, the difference between the outside diameter of the lower end of the main shaft and the inside diameter of the movable connector, the difference between the outside diameter of the second columnar pin and the outside diameter of the columnar upper portion of the holding portion, and the outside diameter of the enlarged-diameter portion of the support of an optical fiber preform or a porous optical fiber preform and the inside diameter of the supporting portion of the holding portion are defined so that the movable connector is able to swing around the axis of the first pin.

* * * * *

UNITED STATES PATENT AND TRADEMARK OFFICE
CERTIFICATE OF CORRECTION

PATENT NO. : 6,519,977 B2
DATED : February 18, 2003
INVENTOR(S) : Mikami et al.

It is certified that error appears in the above-identified patent and that said Letters Patent is hereby corrected as shown below:

<u>Title page,</u>
Item [75], Inventors, should read:

-- [75] Inventors: Toshihiro Mikami, Tochigi (JP); Yukio Koumura, Aichi (JP) --

Signed and Sealed this

Eighteenth Day of May, 2004

JON W. DUDAS
*Acting Director of the United States Patent and Trademark Office*